Patented Oct. 26, 1948

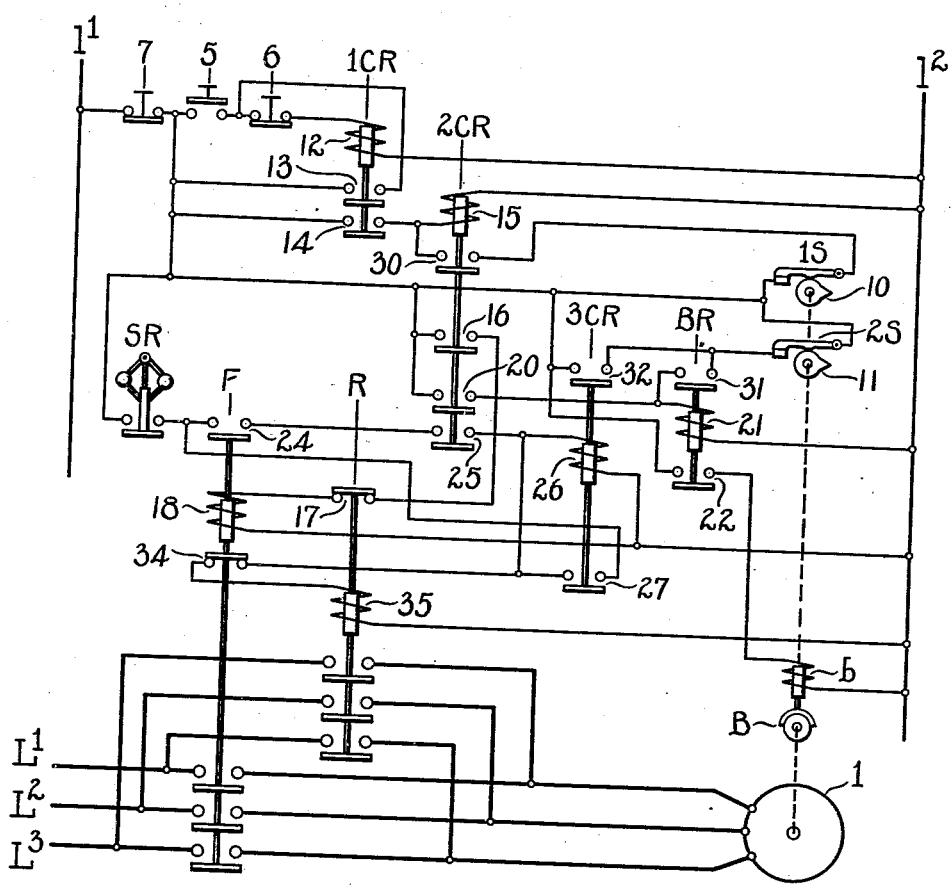

2,452,257

UNITED STATES PATENT OFFICE 2,452,257

CONTROL FOR MOTOR-DRIVEN APPARATUS

John M. Newman, Wauwatosa, Wis., assignor to Cutler-Hammer, Inc., Milwaukee, Wis., a corporation of Delaware Application March 22, 1945, Serial No. 584,187

9 Claims. (Cl. 318—274)

This invention relates to improvements in control for motor driven apparatus, and while not limited thereto is especially applicable to machine tools driven by alternating current motors.

As will be understood, machine tools commonly require so-called indexing control to afford accurate stopping to bring some part into a given position, and the present invention has among its objects to provide improved indexing control for such machine tools and other machines.

Another object is to provide indexing control avoiding need of reverse rotation of the motor or bringing any moving part into engagement with a fixed stop in order to insure the required accuracy of stopping.

Another object is to provide indexing control of the character aforestated which will effect an accurate stop promptly.

Various other objects and advantages of the invention will hereinafter appear.

One embodiment of the invention is illustrated diagrammatically in the accompanying drawing, and the same will now be described, it being understood that the embodiment illustrated is susceptible of various modifications without departing from the scope of the appended claims.

Referring to the drawing, the driving motor 1 to be controlled is illustrated as of the 3 phase induction type to be supplied from lines $L^1$, $L^2$, $L^3$ through electroresponsive reversing switches F and R. As will be understood, the switch F affords line connections for motor 1 for forward operation, while switch R affords reversal of line connections of the motor, the forward and reverse connections shown being well known and hence not requiring description. Also as will be understood, establishment of reverse connections while the motor is operating in forward direction will effect plugging of the motor for quick slowdown thereof. The connections for plugging are shown without resistors, but as will be understood plugging resistors may be provided if desired, as may also be provided, if desired, accelerating resistors for forward operation.

The motor 1 is also provided with a mechanical brake B preferably biased to set and being releasable by an electromagnetic winding b. The brake winding b is under the control of an electroresponsive relay BR.

The control illustrated comprises in addition to the aforementioned reversing switches and relay BR, electroresponsive relays 1CR, 2CR and 3CR, a speed responsive relay SR, indexing switches 1S and 2S, a start push button switch 5 and stop push button switches 6 and 7. Each of the relays has a number of sets of contacts and the reversing switches have auxiliary contacts, certain of which are normally open while others are normally closed. The relay contacts and auxiliary contacts of the reversing switches will be further described hereinafter. The push button switches are of usual form and thus require no further description.

The speed responsive relay SR may be of any preferred type which will afford the required reliability and accuracy of response. Relay SR is to be designed and adjusted for closure while the motor is operating above a given speed and to always release when the motor slows down to such given speed. Especially adapted to the herein disclosed system are the well known centrifugal switch and eddy current plugging switch, but for simplicity of illustration the relay is shown as of the conventional ball governor type.

The indexing switches 1S and 2S may be of any preferred form, but for simplicity they are shown as comprising normally closed switches to be respectively opened by cams 10 and 11 to be driven by the motor 1, the operative connections being schematically illustrated by a broken line. As will be apparent, the cams are so formed as to provide for only momentary opening of each switch when the motor shaft is in a given rotary position. As will be understood, either switch might in accordance with prior practice be electromagnetically controlled to be subjected to the influence of the cams only when required, thus saving wear on the switches.

For forward operation of the motor 1 the start push button switch 5 is depressed for energizing relay 1CR. The energizing circuit of this relay, as will be apparent, extends from a supply lead $l^1$ through the push button switches 7, 5 and 6 in series to and through the winding 12 of relay 1CR to lead $l^2$, and said relay upon responding establishes for itself a maintaining circuit and energizes relay 2CR. The maintaining circuit established by relay 1CR is completed by its normally disengaged contacts 13, and as will be apparent contacts 13 shunt the start switch 5. Relay 1CR energizes relay 2CR through the medium of normally disengaged contacts 14, which contacts when engaged connect the winding 15 of relay 2CR across leads $l^1$ and $l^2$ through push button switch 7, as will be apparent without further description, and relay 2CR in responding energizes the forward switch F. More specifically, relay 2CR in responding engages its normally disengaged contacts 16 to establish circuit from lead $l^1$ through switch 7 and contacts 16 of relay 2CR to and through normally engaged auxiliary contacts 17 of reverse switch R, to and through the winding 18 of forward switch F to lead l². Switch F is thus rendered responsive to complete the forward line connections for the motor 1, whereas meanwhile the motor brake is released by its winding b as the result of energization of relay BR by response of relay 2CR. More specifically, relay 2CR upon response engages its normally disengaged contacts 20 to complete circuit from push button switch 7 through said contacts 20 to and through the winding 21 of relay BR to lead l², and relay BR upon response engages its normally disengaged contacts 22 to establish circuit from switch 7 to and through contacts 22 to and through the brake winding b to lead l². The motor being thus started with brake b released operates in forward direction pending operation of one of the stop push button switches.

Assuming depression of push button switch 7 which is in circuit with the windings of all switches aforedescribed as responding upon depression of push button switch 5, all of said switches open to disconnect the motor from circuit and to release the brake B for stopping without indexing control. For stopping subject to indexing control the push button switch 6 is used instead of the switch 7.

Before describing the indexing control it is desired to point out that relay 3CR is energized as an incident to forward operation of the motor. As the motor accelerates the speed responsive relay SR closes and completes an energizing circuit from switch 7 through the contacts of said relay and the normally disengaged contacts 24 and 25 of switch F and relay 2CR, respectively, to and through the winding 26 of relay 3CR to lead l². Also it is desired to point out that relay 3CR in responding engages its normally disengaged contacts 27 to complete for itself a maintaining circuit extending from winding 26 to relay SR, thereby shunting the contacts 24 and 25 of switch F and relay 2CR, respectively. This, as will be apparent, renders deenergization of relay 3CR dependent upon opening of relay SR in response to reduction of the motor speed. Also, it is desired to point out that relay 2CR upon responding in starting the motor completes for itself a maintaining circuit through its normally disengaged contacts 30 and the indexing switch IS, or more specifically during the periods of closure of switch IS. This maintaining circuit shunts the contacts 14 of the relay 1CR, thus maintaining relay 2CR energized upon release of relay 1CR, assuming switch IS to be closed and pending opening of switch IS as a function of movement of the cam 10 into a given rotary position. Additionally it is desired to point out that brake relay BR when energized as aforedescribed has a maintaining circuit independent of relay 2CR which extends through contacts 31 of relay BR and the indexing switch 2S, whereas the indexing switch 2S is upon response of relay 3CR shunted by contacts 32 of relay 3CR. Thus release of said brake relay is dependent upon prior release of relay 3CR and further dependent upon opening of indexing switch 2S as a function of movement of the cam 11 into a given rotary position.

Assuming depression of switch 6 for stopping subject to indexing control, opening of switch 6 deenergizes relay 1CR. Opening of relay 1CR tends to deenergize relay 2CR, but the latter relay is maintained energized until opening of indexing switch IS. When switch IS opens, relay 2CR releases and deenergizes forward switch F. Such release of forward switch F results in engagement of its contacts 34, and this completes an energizing circuit for reversing switch R to effect plugging of the motor. The energizing circuit for switch R extends from push button switch 7 through the speed responsive switch SR, to and through contacts 27 of relay 3CR to and through contacts 34 of forward switch F to and through the winding 35 of reverse switch R to lead l². Plugging of the motor continues until the motor speed is reduced for release of the speed responsive switch SR, whereupon the reverse switch R releases to disconnect the motor from circuit to afford free coasting of the motor. Moreover at the same time that reverse switch R is released the relay 3CR is released through opening of the speed responsive switch, and release of relay 3CR tends to deenergize brake relay BR and in consequence tends to set the motor brake. However, if the indexing switch 2S is closed when relay 3CR releases relay BR is maintained energized to hold the brake released until the indexing switch 2S is opened, whereupon relay BR is released to deenergize brake coil b for setting of brake B.

This sequence of plugging and braking subject to speed and double indexing control has been found in practice to provide very reliable and accurate indexing even where the number of cycles per minute is relatively small, and it has been found in practice that where the number of cycles per minute is relatively large satisfactory indexing is obtainable without need of indexing switch IS. Also it has been found in practice that satisfactory results are obtainable with the speed responsive switch set to release at approximately 10% of normal speed, but as will be understood the speed responsive switch may be designed and adjusted for release at other speeds if desired. As will be understood, it is desired to have free coasting initiated at a fixed slow speed sufficient to insure continued rotation of the motor to move the machine to the position affording operation of the index switch 2S, at which point the stored energy is about expended so that stopping upon setting of the brake is substantially instantaneous.

What I claim as new and desire to secure by Letters Patent is:

1. In indexing control for a motor driven machine, in combination, a driving motor, a brake therefor, means to effect running of said motor with said brake released and stopping means for said motor comprising means to effect progressively self-braking by said motor with said brake released and free coasting of said motor, a speed responsive switch sensitive to changes in the motor speed, and a plurality of indexing switches each operating only in a given position of a part driven by said motor, said stopping means providing for operation of the means to effect self-braking of said motor but dependently upon operation of one of said indexing switches, and further providing for free coasting of said motor under the control of said speed responsive switch and for setting of said brake subject to control by another of said indexing switches following initiation of free coasting of said motor.

2. In indexing control for a motor driven machine, in combination, a driving motor, a brake therefor, means to effect running of said motor with said brake released, and stopping means for said motor comprising a plugging switch, a speed responsive switch sensitive to changes in speed of said motor and an indexing switch operable in repeated cycles upon continuous operation of said motor, said stopping means further comprising means providing first for closing said plugging switch for slowdown of said motor, then for opening said plugging switch under the control of said speed responsive switch for free coasting of said motor, and then for setting of said brake under the control of said indexing switch.

3. In indexing control for a motor driven machine, in combination, a driving motor, a brake therefor, means to effect running of said motor with said brake released, and stopping means for said motor comprising a plugging switch for said motor, a speed responsive switch sensitive to changes in speed of said motor and a plurality of indexing switches, said stopping means further comprising means providing while said brake is released closing of said plugging switch subject to control by one of said indexing switches, then for opening said plugging switch under the control of said speed responsive switch for free coasting of said motor and then for setting of said brake under the control of another of said indexing switches.

4. The method of stopping substantially in a given position a motor driven machine, which comprises the step of effecting braking of the motor, the further step of effecting free coasting of the motor when its speed is reduced to a given value as a function of braking, and the final step of mechanically braking said motor, initiating such mechanical braking only when the motor is free coasting and only when a part driven by the motor assumes a given position but otherwise without delay following initiation of free coasting of the motor.

5. The method of stopping substantially in a given position a motor driven machine, which comprises the step of effecting braking of the driving motor, timing initiation of braking with attainment of a given position of a part driven by the motor, the further step of effecting free coasting of the motor when its speed is reduced to a given value, and the final step of mechanically braking the motor, timing initiation of mechanical braking with free coasting of the motor and attainment of a given position of a part driven by the motor.

6. In indexing control for a motor driven machine, in combination, a motor, a power supply circuit, motor control means to connect said motor to said circuit for running and progressively to slow down and disconnect said motor preparatory to stopping, a brake for said motor and brake control means including a part movable repeatedly into a given position upon continuous rotation of said motor, said brake control means in said given position of said part being effective to set said brake when but only when said motor has been slowed down and disconnected from circuit by said motor control means for free coasting into the limit.

7. In indexing control for a motor driven machine, in combination, a motor, a power supply circuit, motor control means to connect said motor to said circuit for running and progressively to slow down and disconnect said motor preparatory to stopping, said means including a part movable repeatedly into a given position upon continuous rotation of said motor and said means being effective to initiate slow down only when said part is in such given position, a brake for said motor and brake control means including a part movable repeatedly into a given position upon continuous rotation of said motor, said brake control means in said given position of its said part being effective to set said brake when but only when said motor has been first slowed down and disconnected from circuit by said motor control means for free coasting into the limit.

8. In indexing control for a motor driven machine, in combination, a motor, a power supply circuit, motor control means to connect said motor to said circuit for running and progressively to slow down and disconnect said motor preparatory to stopping, said motor control means comprising means rendering such disconnection of said motor dependent upon reduction of the motor speed to a given value and further comprising means rendering initiation of such slow down dependent upon given positioning of a part thereof which is so positioned in repeated cycles upon continuous rotation of said motor, a brake for said motor, and brake control means including a part movable repeatedly into a given position upon continuous rotation of said motor, said brake control means in such given position of its said part being effective to set said brake when but only when said motor has been first slowed down and disconnected from circuit by said motor control means for free coasting into the limit.

9. In indexing control for a motor driven machine, in combination, a motor, a power supply circuit, motor control means to connect said motor to said circuit for running and progressively to slow down and disconnect said motor preparatory to stopping, said motor control means including motor speed responsive means to time such disconnection of said motor, a brake for said motor and brake control means including a part movable repeatedly into a given position upon continuous rotation of said motor, said brake control means in said given position of said part being effective to set said brake when but only when said motor has been disconnected from circuit by said motor control means for free coasting into the limit.

JOHN M. NEWMAN.

REFERENCES CITED

The following references are of record in the file of this patent:

UNITED STATES PATENTS

| Number | Name | Date |
| --- | --- | --- |
| 1,313,688 | Henderson | Aug. 18, 1919 |
| 1,953,783 | Stone | Apr. 3, 1934 |
| 1,971,881 | Chadbourne | Aug. 28, 1934 |
| 1,971,921 | Seeger | Aug. 28, 1934 |
| 2,137,534 | Lockett | Nov. 22, 1938 |